United States Patent [19]
Baumann

[11] 3,987,809
[45] Oct. 26, 1976

[54] FLUID RESISTANCE DEVICE
[75] Inventor: Hans D. Baumann, Foxboro, Mass.
[73] Assignee: Masoneilan International, Inc., Norwood, Mass.
[22] Filed: Feb. 14, 1975
[21] Appl. No.: 549,886

[52] U.S. Cl. .............................. 138/42; 137/625.28; 137/625.3; 251/127
[51] Int. Cl.² .......................................... F15D 1/04
[58] Field of Search ....................... 138/42, 43, 46; 137/625.28, 625.3; 251/127

[56] References Cited
UNITED STATES PATENTS

| | | | |
|---|---|---|---|
| 1,947,586 | 2/1934 | Fletcher | 138/42 |
| 2,229,441 | 1/1941 | Carlson | 138/42 X |
| 3,529,628 | 9/1970 | Cummins | 138/43 X |
| 3,780,767 | 12/1973 | Borg et al. | 138/42 X |

FOREIGN PATENTS OR APPLICATIONS

| | | | |
|---|---|---|---|
| 811,531 | 6/1951 | Germany | 137/625.28 |
| 690,980 | 4/1953 | United Kingdom | 138/42 |

*Primary Examiner*—Richard E. Aegerter
*Assistant Examiner*—James E. Bryant, III
*Attorney, Agent, or Firm*—Robert A. Townsend

[57] ABSTRACT

A fluid resistance device being part of a fluid system and having high resistance, fluid energy absorbing passages along the interface between a ringtype member and a cylindrical male insert, and wherein said passages consist of a number of teeth-like baffles which are off-set from each other and which are separated from each other by circular grooves providing nearly rectangular throttling restrictions in series for the fluid passing generally along the longitudinal axis of the male insert.

10 Claims, 7 Drawing Figures

FLUID RESISTANCE DEVICE

BACKGROUND OF THE INVENTION

This invention relates to throttling devices used as part of a pipeline or installed in other parts of fluid systems, in order to reduce high static pressure of a liquid or gas without the undesirable by-products of a high aerodynamic noise level in case of a compressible fluid such as natural gas coming from a high pressure gas well, or cavitation and erosion in case of a liquid. A typical liquid pressure reducing application would be boiler feed-water by-passing a feed-water pump under low load conditions, in order to keep the pump from being damaged. In applications like this, pressures as high as 6000 psi have to be reduced without the above mentioned adverse side effects.

Conventional devices employed for these purposes include perforated plates such as shown in U.S. Pat. No. 3,665,965, which generally perform satisfactorily. However, plates of this kind are very expensive to produce because all of the hundreds or sometimes thousands of small holes have to be drilled, a very time consuming effort. Stampings cannot be used because the thickness of the plates has to be more than two times a hole diameter, in order to withstand the stress in the metal caused by the hydrostatic pressure acting on the plate. Furthermore, undesirable resonance phenomena can occur with gaseous fluids, if the plate thickness is less than one hole diameter.

My invention overcomes these difficulties by use of stamped plates requiring essentially no machining and providing sufficiently large openings to accommodate the requirements set by the stamping die in relation to the plate thickness. Yet, the throttling flow passages can be kept small and narrow to ensure high energy losses or, in case of gases, high frequency of the produced aerodynamic noise (high frequency noise is better attenuated by surrounding pipe walls, i.e. produce less observable soundpressure levels outside of a piped fluid system). Any desired narrowness of the throttling flow passages of my invention can simply be determined by the selection of additional simple ring members or washers, which separate the stamped teeth-like configuration which provide vertical passage ways for the fluid.

Other objectives are to provide a compact fluid resistance device, which can be installed in existing piping systems by being clamped between a pair of line flanges and one whose fluid passages can easily be cleaned after being made accessible by a simple separation of a male and female member.

Yet, another objective is the provision of a fluid resistance device which has a relatively high flow capacity, yet offers maximum resistance. Such high flow capacity is possible with my teeth-like stampings, which provide up to 50% of the stamped annular surface area as vertical passage ways.

These and other objectives, features, and advantages of my invention will be readily apparent from the following detailed description taken in conjunction with the accompanying drawings, in which.

DESCRIPTION OF THE PREFERRED EMBODIMENT

Figure 1:
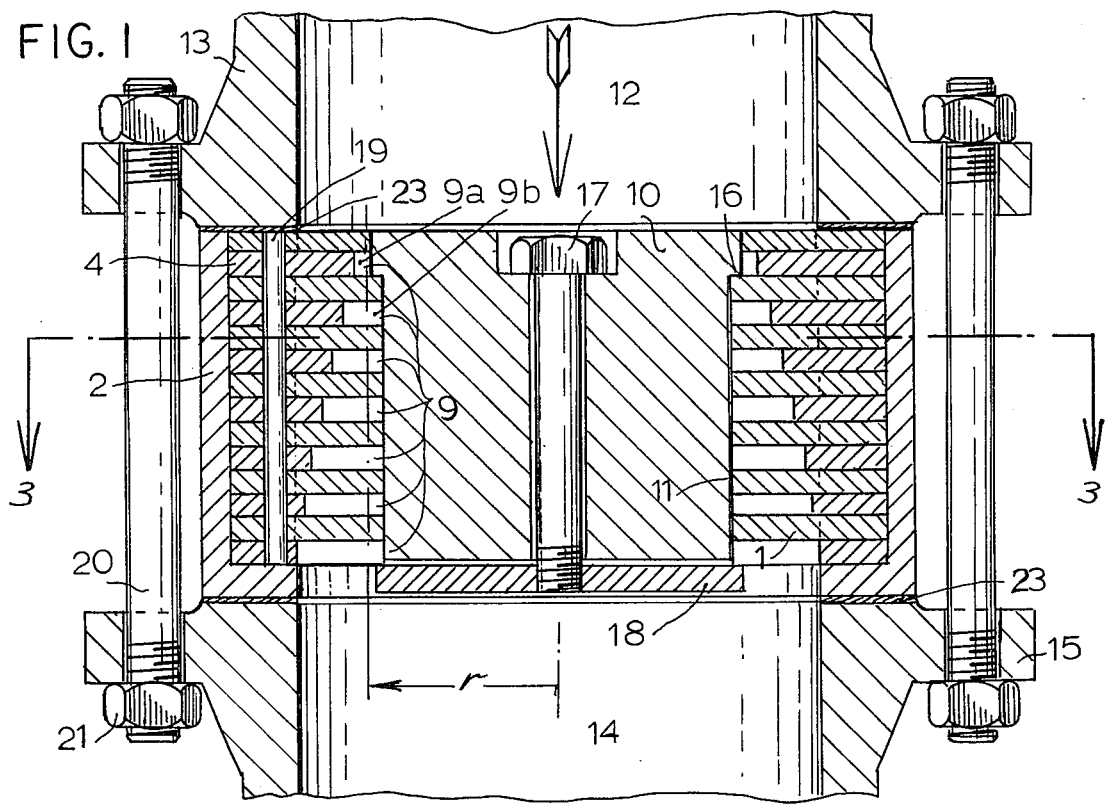
FIG. 1 is a vertical, sectional view of one preferred embodiment of my invention as part of a fluid system and having gradually expanding flow passages.
Figure 3:
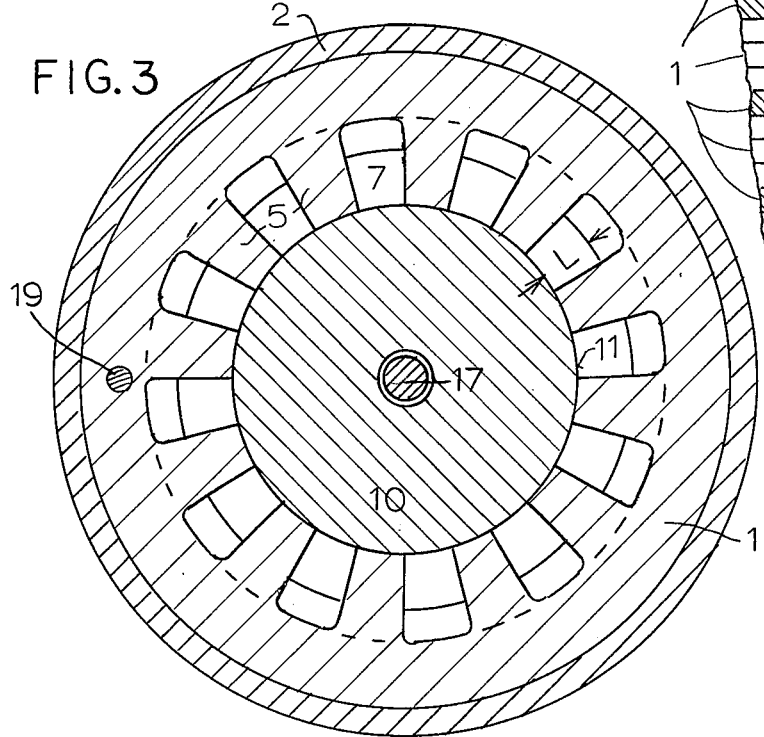
FIG. 3 is a horizontal sectional view of the preferred embodiment of my invention, as shown in FIG. 1.

Referring to FIG. 1, which shows a preferred form of my invention suitable for throttling of high pressure fluids of gaseous nature comprising a female member having a cylindrical opening and formed by a number of ringshaped horizontal plates, being retained within a housing 2 and separated from each other by spacer rings 4 forming therebetween circular channels 9. Each of the ringshaped plates 1 has teeth-shaped baffles 5 alternating evenly around the inner diameter with identically shaped, equal width and depth recesses 7, as more clearly shown in FIG. 3.

Figure 2:
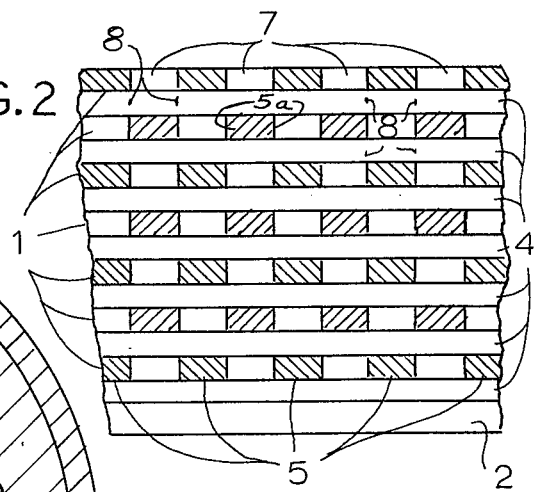
FIG. 2 is a partial development of a vertical sectional view taken around a circle described by radius r in FIG. 1.

As illustrated by FIG. 2, each ringshaped plate 1 is angularly off-set by the width of a tooth from the adjacent plate or plates, with the off-setting of the successive plates being alternately in one and the opposite angular direction, thereby defining reversing or tortuous fluid paths 7, 9, and therein a series of rectangular restrictions 8 on either side of recesses 7, whose area is the product of the depth L of each recess 7 along the portion thereof not covered or overlapped by spacer ring 4 and, in the vertical direction, by the height of spacer ring 4. As can be seen, the cross-sectional area of each rectangular restriction 8 can be varied by either a change in the height of spacer ring 4 or a change in the inside diameter of the same, thereby deepening the circular channels 9, which in cooperation with the flanks 5a of the teeth 5 form the rectangular restrictions 8, wherein one flank 5a of one baffle or tooth of one plate or layer is seen to vertically overlie the opposite flank 5a of the offset tooth of the next baffle layer. A cylindrical male insert 10 is slidingly engaged within the cylindrical opening 11 of plates 1, thereby blocking a fluid entering an inlet section 12, formed by the upper horizontal layer of plates 1 and the inner wall of flange 13, the latter being part of a fluid system, from by-passing said restrictions 8 in its generally vertical travel along the fluid path or paths between the female member and male insert towards an outlet section 14 formed by the lower horizontal layer of plates 1 or spacer rings 4 and the enclosing wall of flange 15 (also being part of a fluid system). Accordingly, the generally vertical fluid path extending along the cylindrical interface of said female member and male insert between said inlet and outlet sections is a continuous, tortuous one wherein the fluid passing therethrough is made to undergo repeated, reversing, vertical-to-horizontal turns from said recesses 7 into said rectangular restrictions 8.

A shoulder 16 of insert 10 engages with one of the plates 1 aided by screw 17, which clamps a washer 18 against the lowest of plates 1. A pin 19 penetrates and connects each layer of plates 1 and spacer rings 4, in order to maintain the off-set teeth arrangement. Finally, tie-rods 20 and nuts 21 retain housing 2 between flanges 13 and 15, while a pair of gaskets 23 prevents external leakage of the fluid. Fluid entering through inlet section 12 passes through the recesses 7 of the first plate 1, divides or separates at the second plate baffles 5 underlying said first plate recesses 7, makes vertical-to-horizontal turns oppositely into and is accelerated by the first set of rectangular restrictions 8, and expands into a cavity formed by circular channel 9a, thereby losing some of its static pressure and, in the case of compressible fluids, expanding its volume. Upon emerging from said channel 9a the fluid recombines, with additional energy loss, upon passing or turning into the next set of restrictions 8. The following cavity 9b is enlarged in comparison to accommodate the aforementioned expansion in volume. This successive throttling process is repeated several times, until the fluid is allowed to exit through the last of plates 1 and escapes into the outlet section 14.

Figure 4:
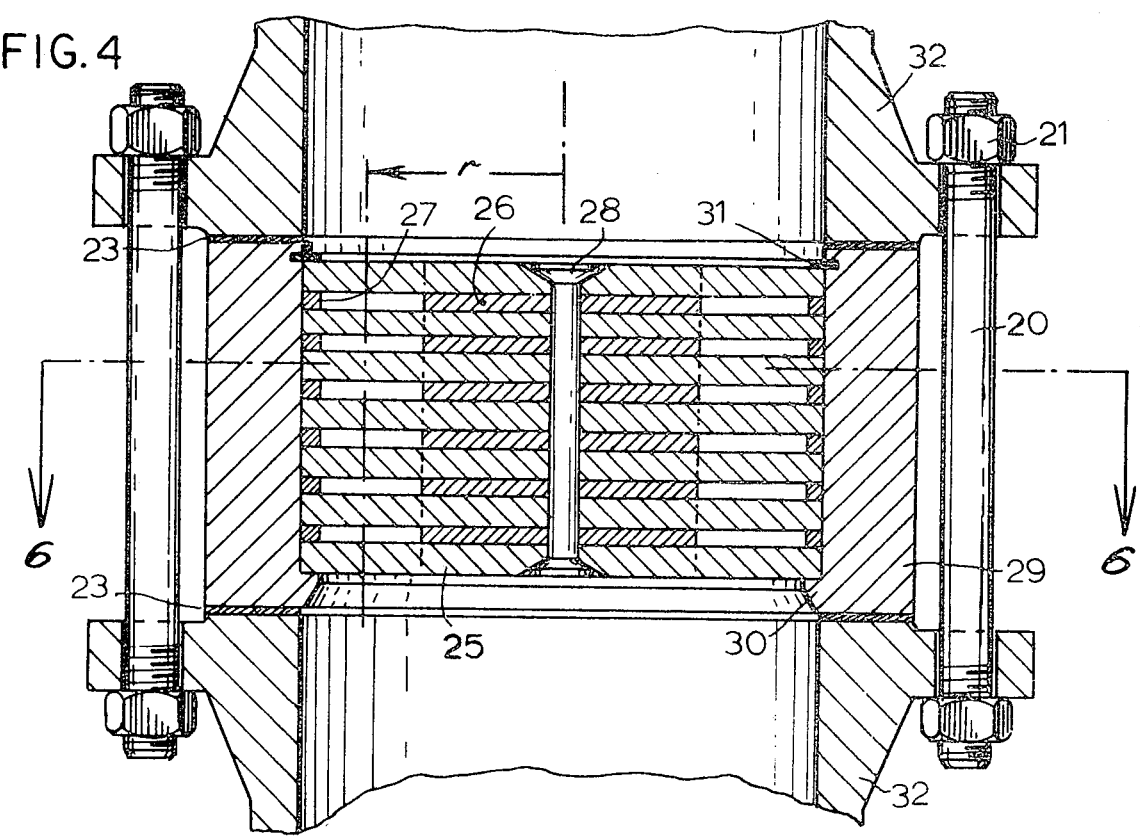
FIG. 4 is a vertical, sectional view of another preferred embodiment of my invention having flow passages with constant cross-sectional areas and being shown as part of a fluid system.
Figure 6:
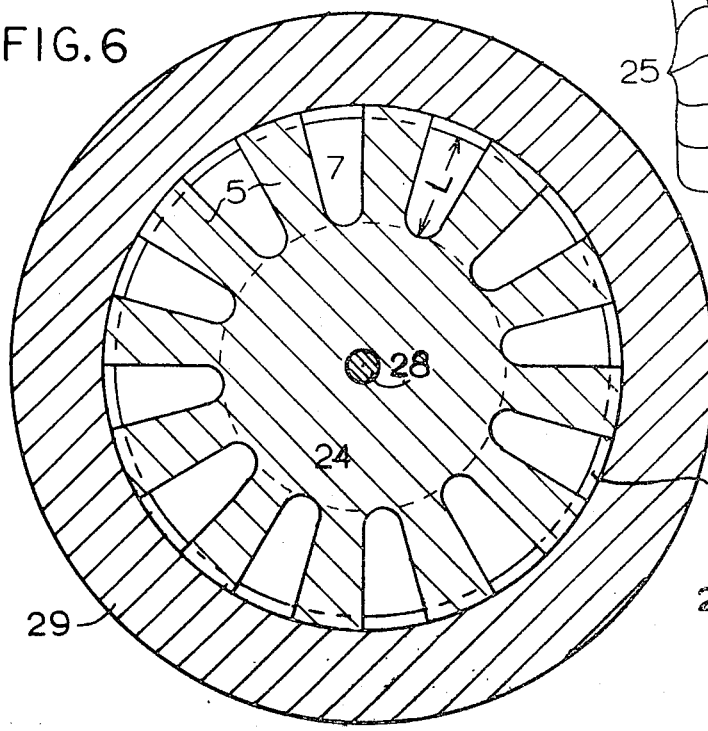
FIG. 6 is a horizontal, sectional view of the preferred embodiment of my invention as shown in FIG. 4.
Figure 5:
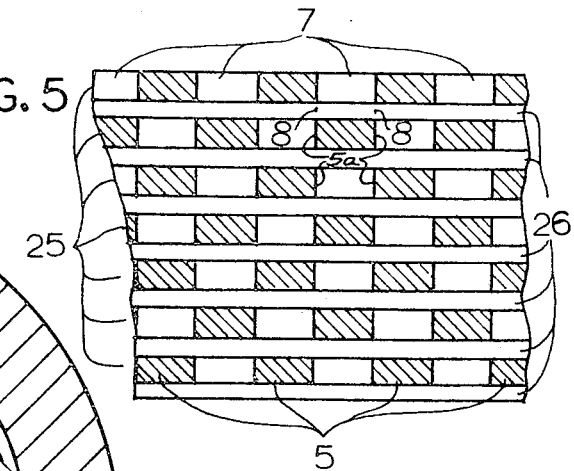
FIG. 5 is a partial development of a vertical, sectional view taken around a circle described by radius r in FIG. 4.
Figure 7:
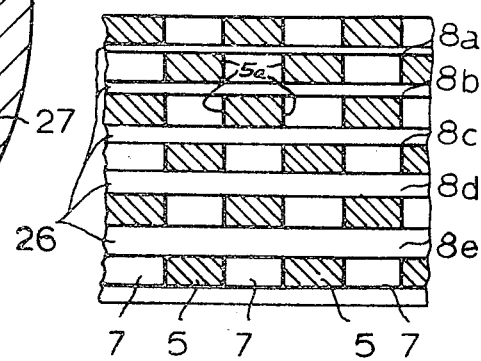
FIG. 7 is a partial development of a vertical, sectional view similar to FIG. 5, with progressively increasing separation of successive layers of baffles hence, gradual increasing flow areas.

FIG. 4 shows another embodiment of my invention, more adapted to fluids with generally constant volume. Another difference in the form of construction lies in the fact that all teeth-like baffles 5 and fluid conducting recesses 7, described previously, are now part of the male insert instead of the female ringshaped counter part, as in FIG. 1. The male insert 24 here consists of a number of plates 25 having equally spaced tooth-like baffles 5 and recesses 7 at their outer periphery and being separated from each other by circular washers 26 of which the outer diameter forms a bottom for circular channels, which determine the size of rectangular restrictions 8, as previously described. Incidentally, a gradual increase in the area of restrictions 8, as demanded for compressible fluids, is also possible by gradually increasing the thickness of successive layers of washers 26, as shown in FIG. 7, thereby progressively increasing the height of restrictions 8a to 8e and hence the size or area of the respective rectangular throttling restriction or orifice. Additional supporting rings 27 may be placed around the outer periphery of plates 25, in order to support and keep baffles 5 from bending under high pressure loading. The inner diameter of these supporting rings now form the cylindrical opening for the flow channels conducting fluid flow in generally vertical directions. The complete assembly of male insert 24 is suitably fastened together by a rivet 28 and thereafter slidingly engaged within the cylindrical opening of a housing 29, preferredly machined from steel pipe, abutting a shoulder 30. A commercially available retaining ring 31 made from spring tempered steel, which fits snugly in a groove, cut into housing 29, finally retaines the assembly of male insert 24. Housing 29 and male insert 24 are part of a fluid system and are contained with a pair of flanges 32 held together by suitable tie-rods 20 and nuts 21, as previously described.

The preferred embodiments of my invention are shown to be made from stampings and where the tooth-like baffles and recesses have trapezoidal shape and are equal in size.

However, it should be understood that my invention is not limited to that particular configuration. For example, circular channels 9 and recesses 7 may be precision cast into a single cast piece constituting, for example, the cylindrical male insert assembly 24 or the ring-shaped combination of plates 1, housing 2 and spacer rings 4. Similarly, recesses 7 might be shaped rectangularly or semi-circular without departing from the scope of the following claims.

I claim:

1. In a fluid system, a fluid resistance device comprising
    a female member having a cylindrical opening therethrough;
    a cylindrical male insert,
    said female member and cylindrical male insert having ends,
    said cylindrical male insert received within and engaged at said cylindrical opening of said female member,
    said male insert and female member constituting parts of, and defining at their ends inlet and outlet sections within, said fluid system;
    means forming a continuous, tortuous fluid path between said female member and male insert,
    said fluid path arranged generally vertically of, and extending the full engaged length of, said female member and male insert, and thereby conducting fluid flow from said inlet section to said outlet section,
    said fluid path forming means comprising
    annular means defining vertically repeating layers of horizontal baffles,
    said horizontal baffles having widths and formed and spaced by vertically repeating layers of horizontal recesses in said annular means, said horizontal recesses having widths, and
    means vertically separating said horizontal baffle layers and forming therebetween horizontal circular channels having cross-sectional areas,
    the cross-sectional area of said channels between said layers being such, in relation to the cross-sectional area of said recesses between said baffles, as to form throttling restrictions in series through which said fluid flow through said tortuous path is successively accelerated, and
    said baffle widths being related to said recess widths and said baffle layers being successively oppositely angularly offset from the vertically adjacent baffle layer or layers such that said fluid flow through said tortuous path is continuously reversing between and around alternately vertically overlying baffles.

2. The fluid resistance device of claim 1, wherein said annular means comprise plates having baffle forming recesses at a circular surface, said recesses having inner and outer portions, and wherein said circular channel forming means comprise spacer rings covering at least one of said inner and outer portions of said recesses, and thereby forming said throttling restrictions as essentially rectangular horizontal orifices between said vertically overlying baffles.

3. The fluid resistance device of claim 1, wherein said horizontal circular channels are of progressively increasing depth toward said outlet section, and thereby progressively increase the areas of said restrictions in series to allow for volumetric expansion of the fluid passing therethrough.

4. The fluid resistance device of claim 1, wherein said horizontal circular channels are of progressively increasing height towards said outlet section, and thereby progressively increase the areas of said restrictions in series to allow for volumetric expansion of the fluid passing therethrough.

5. The fluid resistance device of claim 1, wherein said baffle layers comprise like plates having each a cylindrical periphery characterized by like teeth equally spaced by like recesses.

6. The fluid resistance device of claim 1, wherein said baffles, channels and recesses are precision formed in a single cast piece.

7. The fluid resistance device of claim 1, wherein said horizontal baffles have flanks along said recesses, and wherein the offsetting of said baffle layers is such as to vertically overlie the opposite flanks of the successive layer baffles, whereby said series restrictions extend vertically of the device, and whereby the reversing flow of said fluid through said tortuous passage is by reversely repeating vertical-to-horizontal turns from said recesses into said restrictions.

8. The fluid resistance of claim 1, wherein the construction and offsetting of said baffle layers is such as to vertically overlie the baffles of every second layer, whereby in its flow through said tortuous passage said fluid divides and recombines through restrictions formed by alternate layer baffles underlying alternate layer recesses.

9. The fluid resistance device of claim 5, wherein said cylindrical periphery is an inner periphery.

10. The fluid resistance device of claim 5, wherein said cylindrical periphery is an outer periphery.

* * * * *